May 9, 1933. H. M. NAUGLE ET AL 1,908,168
MAKING SEMIFINISHED OR FINISHED STEEL PRODUCTS
Filed May 17, 1930
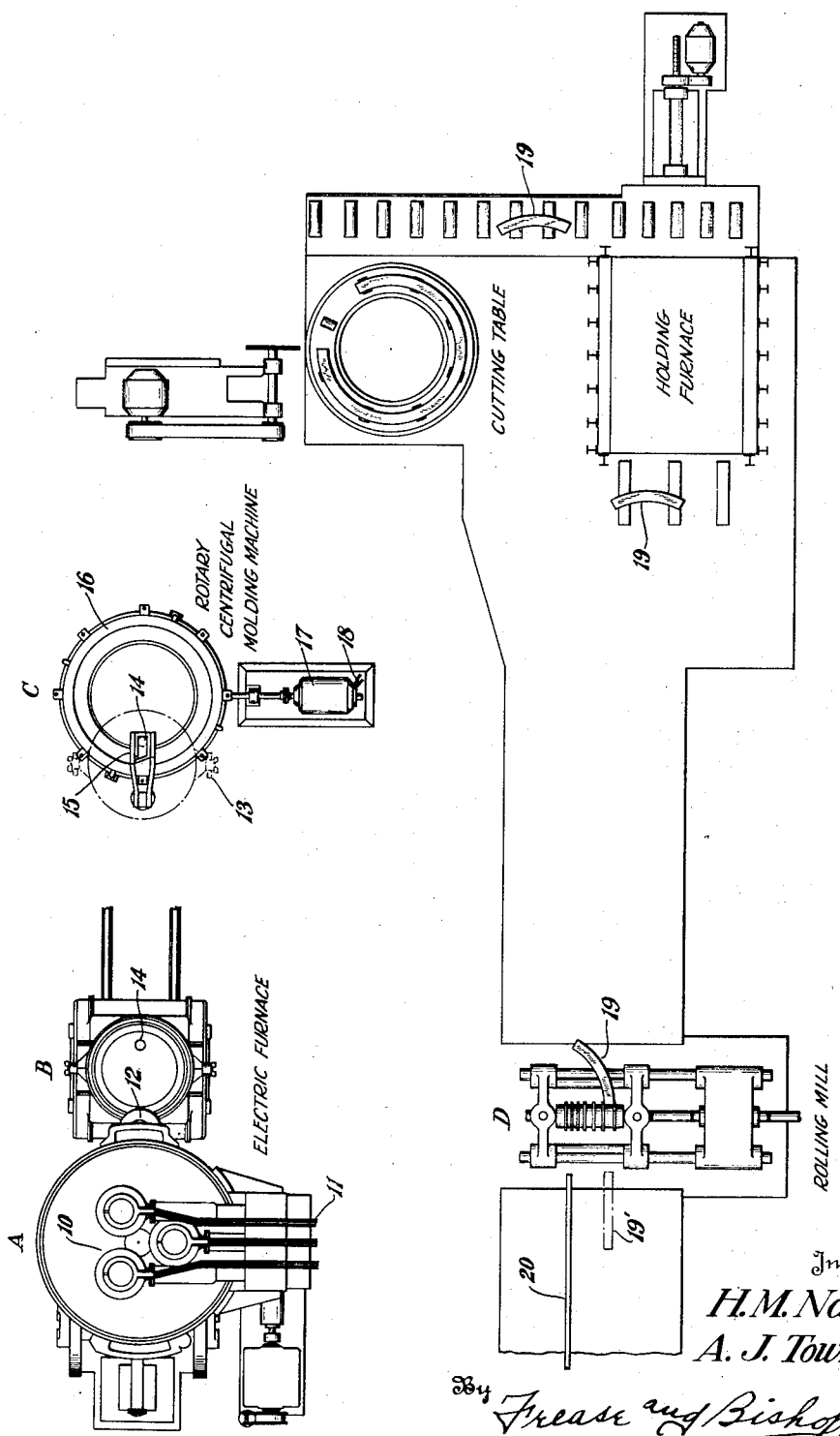
Inventors
*H. M. Naugle*
*A. J. Townsend*
By Frease and Bishop
Attorneys Patented May 9, 1933

1,908,168

UNITED STATES PATENT OFFICE

HARRY M. NAUGLE AND ARTHUR J. TOWNSEND, OF CANTON, OHIO, ASSIGNORS TO NAUGLE & TOWNSEND, INC., OF WILMINGTON, DELAWARE, A CORPORATION OF DELAWARE

MAKING SEMIFINISHED OR FINISHED STEEL PRODUCTS

Application filed May 17, 1930. Serial No. 453,311.

The invention relates to the production of semi-finished steel products such as blooms, slabs, billets, sheet bars and the like, or finished steel products such as bars, rails, shapes and the like, from molten metal tapped from a melting furnace without the intermediate production and soaking pit heating of ingots, and without carrying out any rolling operations on a mill of the type and size commonly known as a blooming mill.

According to common practice, pig iron, steel scrap and other necessary raw material, are charged into an open hearth furnace, wherein they are heated for melting, reduction, and refinement by producer gas, or natural gas, or fuel oil or the like. The resulting refined molten metal is then tapped from the open hearth furnace into a large ladle, from whence it is poured while still in molten condition into ingot molds.

After the ingots have solidified sufficiently to maintain their own shape and weight, the ingot molds are stripped from the ingots, whereupon the ingots are placed in a soaking pit for completing the solidification of the ingots throughout, and for heating the ingots to a substantially uniform temperature throughout their mass.

The ingots are then taken from the soaking pit and rolled on a blooming mill to produce semi-finished products such as blooms, slabs, billets or sheet bars.

In some cases, when it is desired to make special analysis alloy steels or high quality carbon steels, an electric furnace is substituted for the open hearth furnace, the metal refined therein being tapped into a ladle, molded in ingot molds to form ingots, the ingots then being stripped, soaked, and reduced on a blooming mill to form semi-finished products.

In case the electric furnace is substituted for the open hearth furnace, the principal raw materials are pig iron and scrap supplemented by the necessary materials required for producing the desired alloy or carbon steel.

Sometimes, however, the electric furnace is operated in conjunction with the open hearth furnace to carry out what is known as the "Duplexing Process", in which case the raw material for the electric furnace is molten metal tapped from the open hearth furnace supplemented by the necessary materials required for producing the desired finished product.

In any event, the use of the electric furnace as above outlined increases the production cost of semi-finished products because of the increased fuel charges. Moreover, regardless of whether the open hearth furnace, or the electric furnace, or the "Duplexing Process" is utilized as above set forth, the yield in the form of semi-finished rolled steel products such as blooms, slabs, billets, sheet bars or the like, under normal practice, is approximately 80% of the ingots produced by the open hearth or electric furnace, as the case may be.

The semi-finished products such as blooms, slabs, billets, sheet bars or the like, produced by any of the preceding methods of common practice are then rolled on standard mills to produce finished products such as bars, shapes, sheets and the like.

The use of the basic open hearth furnace involves the use of pig iron as a raw material, and pig iron requires for its economic production, a blast furnace, by-product coke ovens, and sundry auxiliaries, together with the necessary blast furnace raw materials consisting essentially of iron ore, fuel and limestone.

Consequently, huge steel plants consisting of blast furnaces, coke ovens, open hearth furnaces and/or electric furnaces, soaking pits, and blooming mills, together with auxiliary equipment, must be concentrated at relatively few places strategically located with respect to ore and coal fields.

Of course, the open hearth and/or electric furnaces, soaking pits, and blooming mills are not necessarily located at the same place as the blast furnace, but when located at a different place, the cost of transportation of pig iron from the blast furnace to the open hearth and/or electric furnaces, soaking pits and blooming mills must be added to the cost of production of the semi-finished or finished rolled steel products.

Thus, under present conditions, extremely expensive steel making equipment is concentrated at one place, the raw materials are brought to the place of concentration, and the produced semi-finished or finished rolled steel products are then shipped with an attendant transportation charge to the widely scattered marketing centers or places of consumption.

The consumers of the various steel plant products in fabricating their respective specialties, produce enormous amounts of scrap which is thus located at the place of consumption of the finished steel products, and which, together with worn out machinery, worn out rails and railroad rolling stock, discarded automobiles and the like, reach tens of millions of tons of scrap material each year in the United States.

This scrap material, in order to be utilized as a raw material for making steel, must then be transported from its place of origin, which in most instances is also the marketing center for finished steel products, back to the huge steel plants, whereupon the finished steel plant products are again reshipped to the marketing centers.

The use of every ton of scrap material in this country results in a saving of one ton of pig iron, or in other words, the use of scrap material results in the conservation of the natural resources from which the pig iron is made, which consist of iron ore, limestone, and fuel, together with the elimination of labor required for smelting the same to form pig iron.

However, the concentration of scrap material at many marketing centers for or places of consumption of finished steel products in this country, such as in the southwest, the west, the central west, and in New England, is not suffiicent, when considered in connection with the cost of transporting pig iron and fuel to such localities where scrap is located, to warrant a fixed investment of millions of dollars in open hearth furnaces, soaking pits, blooming mills, and auxiliary equipment, in order to produce semi-finished or finished steel plant products at the place of origin of one of the open hearth furnace raw materials in the form of scrap.

Accordingly, the location of expensive open hearth steel plants at many marketing centers for steel plant finished products will increase the cost of the production of the steel plant products at those places, and will increase the cost of production of the products fabricated therefrom, not only because of the large fixed charges, but also because of the pig iron and fuel transportation charges which must all be added to the cost of production of the steel plant products.

Moreover, the size of such steel plants including open hearth furnaces, soaking pits, blooming mills and auxiliary equipment would be entirely too big to satisfy local demands at such places, so that the plants could not be kept busy and large standby charges would also be added to the cost of production of the steel plant products.

It is an object of the present invention to provide a method of and appartus for producing semi-finished or finished rolled steel products which makes the economical operation of a small sized steel plant possible.

It is a further object of the present invention to eliminate open hearth furnaces, ingot molds, soaking pits, and blooming mills costing many millions of dollars from the equipment required for making semi-finished or finished rolled steel products.

It is a further object of the present invention to effect great savings in the cost of production of semi-finished or finished rolled steel products by greatly simplifying the method of and apparatus for making the same so as to utilize apparatus having initial costs of only thousands of dollars in order to materially reduce the fixed charges forming part of the cost of production of the rolled steel products.

It is likewise a further object of the present invention to provide apparatus which may be conveniently, economically, and inexpensively located and operated at any place of origin of and concentration of raw material in the form of scrap, which place may also be a marketing center for semi-finished or finished rolled steel products produced from the scrap, so as to eliminate scrap transportation charges to the present day huge steel plant, and to eliminate rolled steel product transportation charges from the huge steel plant to the marketing center.

Furthermore, it is an object of the present invention to produce semi-finished or finished steel products having more superior qualities, finer grain structures, and better characteristics than have heretofore been produced under present practice.

The present invention contemplates the use of an electric furnace having scrap for its raw material, the metal melted and refined in the electric furnace being tapped into a ladle, from whence the fluid molten metal is poured, flowed and compressed into a rotating annular mold of a rotary centrifugal molding machine to form an annular continuous or discontinuous ring, the ring being straightened and rolled either to form semi-finished rolled steel products such as blooms, slabs, billets, sheet bar and the like, or straightened and rolled in a special mill involving a relatively small number of passes to form certain finished rolled steel products.

The ultimate yield of semi-finished or finished products resulting in carrying out the improved process, will be approximately 95% of the material tapped from the electric melting furnace, the remaining 5% of metal resulting in scrap which may be recharged into the electric furnace and remelted therein.

This extremely high yield which characterizes the improved process set forth herein results from the use of the rotary centrifugal molding machine which eliminates pipe and makes a relatively small bloom directly from molten metal without the necessity of end-cropping.

On the other hand, the yield of semi-finished or finished products resulting under present practice is only 80% of the ingots produced, the remaning 20% of metal resulting in the form of scrap, which must be remelted in the open hearth furnace and/or electric furnace.

Thus, by reducing the cost of remelting the 20% of scrap produced under present practice, to a cost of remelting the 5% of scrap produced in carrying out the improved process, a 300% saving in remelting costs is attained, which saving is directly due to the use of the rotary centrifugal molding machine in combination with the electric furnace.

Accordingly, the electric furnace with its high quality producing characteristics can economically and practically be used in combination with the rotary centrifugal molding machine because the necessity of remelting the 15% of scrap in the electric furnace at a high fuel cost is eliminated.

Moreover, the cost of erecting a steel plant utilizing an electric furnace, a rotary centrifugal molding machine, and a small rolling mill, involves the investment of only thousands of dollars in equipment, which plant may accordingly be economically located at the concurrent place of origin of raw material in the form of scrap and marketing center for finished materials.

On the other hand, it would be impossible, impractical and uneconomical to locate a basic open hearth steel plant at such a concurrent place of origin of raw material in the form of scrap, and marketing center for finished rolled steel products, because of the high plant cost, and because of the cost of transporting pig iron and fuel to the open hearth furnace.

Thus, regardless of the fact that the fuel cost in carrying out the present inventions and improvements, i. e., the cost of electric current, may be substantially higher than the cost of fuel required in standard open hearth practice, the delivered cost of semi-finished or finished rolled steel products produced by carrying out the present inventions and improvements will be reduced from present day delivered costs because of the increase in yield attained by the present invention, because of the substantial reduction in remelting costs, because of the elimination of many operations, and because of the elimination of scrap transportation charges to, and finished product transportation charges from large sized present day steel plants including open hearth furnaces, soaking pits, and blooming mills.

Moreover, along with the reduction in delivered cost, a higher quality product is produced, having a finer and more uniform grain structure than results in carrying out common practice under ordinary methods.

The drawing illustrates diagrammatically a general view of apparatus which may be utilized in carrying out the present invention.

Similar numerals refer to similar parts throughout the drawing.

Raw materials, consisting of scrap metal and other necessary refining and/or alloying materials are charged into and melted in an electric furnace indicated generally at A, which may be either the resistance, arc, or induction type, but which is shown as preferably being the arc type, having electrodes indicated diagrammatically at 10 connected with any suitable source of electric power as by conductors 11.

After the raw materials are refined in the electric furnace so that the molten metal has the desired chemical characteristics, and has reached a temperature of 2600° F. and upwards, the same is tapped from the furnace A. through the pouring spout 12, into the ladle B wherein it will be transported, preferably by an overhead travelling crane having crane hooks 13, to the position shown in dotted lines in the drawing, above the rotary centrifugal molding machine C, whereupon the fluid molten metal which still has a temperature of 2600° F. and upwards is tapped from the ladle B through its pouring spout 14 into the runner 15.

The molten metal then flows from the runner 15 into the annular mold cavity of the rotatable annular mold 16, which may be rotated by an electric motor indicated generally at 17, connected to any suitable source of electric power by conductors 18, and the fluid molten metal is compressed in the mold cavity by the pressure created by centrifugal force, the pressure being maintained until the metal has reached a self-sustaining plastic condition to form a molded annular ring.

When the molded annular ring has sufficiently solidified and cooled to permit removal thereof from the mold, the mold is opened and the ring is removed, at which time the ring may either be severed at one place and straightened and rolled to form a semi-finished or finished rolled steel commodity having the length of the annular ring, or it may be severed at many places to form a number of arcuate blooms 19 which may be passed through a special rolling mill indicated diagrammatically at D for being straightened to form straight blooms 19', and reduced to form billets 20 or other semi-finished or finished rolled steel products.

The straightening and rolling operations may be performed upon the annular ring following its removal from the rotary centrifugal molding machine C without reheating the metal, but it is noted that for production reasons it may not be desirable to carry out the melting, centrifugal molding, straightening and rolling operations at one time whereupon the material will be allowed to cool and will be stored for being rolled and reduced at some later time.

When the later rolling operations are carried out, the blooms which have been stored will be heated to approximately the temperature prevailing either before or after the straightening operation previously carried out, as the case may be.

Moreover, when the annular ring is removed from the mold and severed to form a number of arcuate billets, one rolling mill can operate on only one billet at a time and the remaining billets are preferably placed in a flash heating or holding furnace for maintaining the temperature of the billets until they may be passed through the rolling mill D.

Thus, the statement that the various operations may be carried out all without reheating the metal following the melting operation, means that the temperature of the metal is not materially raised between the centrifugal molding operation and the rolling operation but that the material may be cooled, stored and reheated or may have its temperature maintained until it is passed through the rolling mill.

Various methods have been proposed for the centrifugal molding of rings or so-called hollow ingots and then opening and straightening the same, but these methods have been used for producing comparatively small cross sections, short lengths, special surfaces, and limited masses of metal, for drawing or rolling the same directly into wire, sheets, light rails, seamless tubing, and other like products; but such lighter operations do not develop difficulties which attend the making of massive rings, having a cross sectional area of sixteen square inches and upwards, and a circumference of twenty-five feet and upwards, which is contemplated by the present improvement.

When the annular ring produced on the rotary centrifugal molding machine C has a cross sectional area of sixteen square inches and upwards, and a circumference of twenty-five feet and upwards, which we have characterized as a massive ring in an application for making blooms, slabs and billets, filed January 18, 1930, Serial No. 421,894; the same may be passed a relatively few times through the rolling mill D, to make a finished rolled steel product.

In certain cases it may be desirable to produce rails, heavy shapes or the like, whereupon the annular ring produced on the rotary centrifugal molding machine C will have a cross sectional area of sixty-four square inches more or less, and the same in being passed a relatively few number of times through a special rolling mill D, having properly shaped rolls, will result in a finished rolled steel product such as a rail, a heavy shape, or the like.

However, for certain practical reasons it may be desirable to mold annular rings having cross sectional areas of from thirty-six square inches to sixty-four square inches and upwards, the annular ring, following its removal from the centrifugal molding machine C, being subjected to straightening and rolling operations by being passed through the rolling mill D to produce a semi-finished rolled steel product, which will then be reheated and further rolled on a second stand of rolls so as to produce a finished rolled steel product.

The centrifugal molding operation may be carried out in accordance with the methods set forth in our pending applications entitled Making blooms, slabs and billets, Serial No. 312,802, filed October 16, 1928, and Serial No. 421,844, filed January 18, 1930, which have been consolidated in our continuing application Serial No. 465,303, filed July 2, 1930, matured in Letters Patent No. 1,882,516, granted October 11, 1932; the rotary centrifugal molding machine C may be constructed in accordance with the disclosure of our pending application entitled Centrifugal molding apparatus, Serial No. 429,359, filed February 18, 1930; the molded annular ring may be preferably formed having two parallel and two non-parallel sides in cross section by carrying out the method set forth in our copending application entitled Making blooms, slabs and billets, Serial No. 448,602, filed April 30, 1930; and the formation of an annular fin on the interior of the molded annular ring so that it can be readily removed from the ring, may be carried out by the method and apparatus set forth in our pending application entitled Method of making blooms, slabs and billets and rotary centrifugal molding apparatus therefor, filed herewith on May 17, 1930, Serial No. 453,310.

By carrying out the improved method set forth herein, there is no coarse granular crystalline structure in the resulting molded annular ring, which coarse granular crystalline structure always occurs whenever ingots are formed as a part of the process of making steel products. Accordingly, the present invention eliminates the requirement of mechanically working the blooms, slabs, billets and the like produced, for breaking down any coarse grain structure. Thus, the product resulting from carrying out the present invention has a finer and more uniform grain structure than similar products produced under present day methods.

We have unexpectedly discovered that the metal in the blooms and other steel products made by electric melting and centrifugal casting has superior qualities, better grain structure and improved physical characteristics, and that it is characterized by a greater homogeneity, as compared with metal of similar analysis made by electric melting and still casting.

The metal in the blooms, with a given percentage of elongation, has a higher elastic limit than steel having the same analysis made by orthodox methods and apparatus.

In other words, the metal in the blooms, and other products, with a given elastic limit, has a greater percentage of elongation than steel having the same analysis made by conventional methods and apparatus.

Moreover, if the electrically melted centrifugally cast metal blooms and other products are annealed, the metal has metallographic characteristics similar to steel made by ordinary methods which has been worked as by rolling.

These phenomenal characteristics are reflected in the ability to subject the metal to much greater cold rolling reductions, which may be from 70% to 90% reductions, without intermediate annealing, as compared with a 50% reduction, which is the prior maximum practice as set forth in our prior patent Reissue No. 16,652 of July 14, 1927, for method of making stripsheets.

And finally, rolling and reducing operations are carried out immediately upon removal of the annular ring from the mold while the ring still retains a portion of the initial heat of the melting operation. Thus the necessity of and expense of reheating between molding and rolling operations is eliminated.

We claim:—

1. The method of making rolled steel products which consists in electrically melting raw materials to form molten metal; pouring, flowing, compressing, and solidifying the molten metal in an annular mold by centrifugal force to form a massive annular ring; then severing the ring to form arcuate blooms; and then straightening and rolling the arcuate blooms to form a commercial semi-finished or finished rolled steel commodity.

2. The method of making rolled steel products which consists in electrically melting scrap material to be molten; pouring, flowing, compressing and solidifying the molten metal in an annular mold by centrifugal force to form a massive annular ring; then severing the ring to form arcuate blooms; and then roll straightening and reducing the arcuate blooms to form a commercial semi-finished or finished rolled steel commodity.

3. The method of making rolled steel products which consists in electrically melting raw materials to form molten metal; pouring, flowing, compressing and solidifying the molten metal in an annular mold by centrifugal force to form an annular ring; then severing the ring to form arcuate blooms; and then roll straightening and reducing the arcuate blooms to form a commercial semi-finished or finished rolled steel commodity; all without reheating the metal after the initial melting operation.

In testimony that we claim the above, we have hereunto subscribed our names.

HARRY M. NAUGLE.
ARTHUR J. TOWNSEND.